United States Patent
Iizuka

(10) Patent No.: US 8,926,103 B2
(45) Date of Patent: Jan. 6, 2015

(54) BARRIER MECHANISM, CAMERA, AND MOBILE INFORMATION TERMINAL

(75) Inventor: Atsushi Iizuka, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 13/823,887

(22) PCT Filed: Oct. 5, 2011

(86) PCT No.: PCT/JP2011/073460

§ 371 (c)(1),
(2), (4) Date: Mar. 15, 2013

(87) PCT Pub. No.: WO2012/046875

PCT Pub. Date: Apr. 12, 2012

(65) Prior Publication Data

US 2013/0170037 A1    Jul. 4, 2013

(30) Foreign Application Priority Data

Oct. 5, 2010  (JP) .................................. 2010-225614

(51) Int. Cl.
| | | |
|---|---|---|
| G02B 23/16 | (2006.01) | |
| G03B 9/08 | (2006.01) | |
| G03B 11/04 | (2006.01) | |

(52) U.S. Cl.
CPC .............. G03B 11/04 (2013.01); G03B 11/043 (2013.01)
USPC ......................................... 359/511; 396/452

(58) Field of Classification Search
None
See application file for complete search history.

(56) References Cited

FOREIGN PATENT DOCUMENTS

| JP | 2007-102086 | 4/2007 |
|---|---|---|
| JP | 2010-008830 | 1/2010 |
| JP | 2010-054880 | 3/2010 |
| JP | 2011-158735 | 8/2011 |

OTHER PUBLICATIONS

International Search Report Issued Jan. 24, 2012 in PCT/JP2011/073460 Filed Oct. 5, 2011.

*Primary Examiner* — Jade R Chwasz
(74) *Attorney, Agent, or Firm* — Oblon, Spivak, McClelland, Maier & Neustadt, L.L.P.

(57) ABSTRACT

A barrier mechanism includes a barrier blade group (G1) having barrier blades (A1), (B1), (C1) which are rotatably retained by a single spindle (S11); an elastic member (E11) provided to the spindle (S11) substantially coaxially with a rotating center of the barrier blade group (G1), and configured to generate torque for driving the barrier blade (A1) to rotate,' and a frame member formed by a barrier cover (F1) and a barrier (F2) each including an aperture serving as a window for opening an effective optical path of an optical lens, and configured to house the barrier blade group (G1) and the elastic member (E1) between these members. The spindle (S11) includes a flange portion (S11f) configured to separate the barrier blade group (G1) from the elastic member (E11) in a direction of an optical axis.

9 Claims, 14 Drawing Sheets

TOWARD REAR FACE ← → TOWARD FRONT FACE

TOWARD FRONT FACE ← → TOWARD REAR FACE

TOWARD FRONT FACE ← → TOWARD REAR FACE

BARRIER MECHANISM, CAMERA, AND MOBILE INFORMATION TERMINAL

TECHNICAL FIELD

The present invention relates to a barrier mechanism configured to open, close, and protect an objective surface of an optical system in an optical apparatus such as a camera and to protect the optical system against dust or stains caused by fingers. Specifically, the present invention relates to a barrier mechanism suitable for a camera, a mobile information terminal and the like provided with a motor-driven movable lens tube, and to a camera and a mobile information terminal provided with the barrier mechanism.

BACKGROUND ART

Various types of devices have heretofore been proposed as barrier mechanisms (optical system barrier devices) configured to open, close, and protect an objective surface of an optical system in an optical apparatus such as a camera provided with a motor-driven movable lens tube, and to protect the optical system against dust or stains caused by fingers. For example, Patent Document 1 discloses a structure characterized in that: the structure is provided with barrier blade groups each including at least three barrier blades for the purpose of suppressing an increase in dimensions and complication of the structure, and protecting an optical system and a lens tube securely and appropriately, while securing a large opening, as well as for the purpose of achieving a simple structure, making it less likely to cause operational problems, and enabling the downsizing of the lens tube; and the barrier blades are arranged in the order of a metallic barrier blade, a resin barrier blade and a metallic barrier blade.

In the optical system barrier device of this type, a mechanism for driving a barrier blade group formed of the multiple barrier blades to open and close is generally provided with a first elastic member, such as a torsion spring, for biasing the barrier blade group so as to establish a closed state. Meanwhile, the mechanism is generally provided with: a second elastic member for driving the barrier blade group so as to establish an opened state by applying a stronger elastic force than that of the first elastic member; and a clutch mechanism for discontinuing the application of the elastic force of the second elastic member to the barrier blade group when driven by an external force.

In this case, if a torsion coil spring (hereinafter a closing spring), for example, is used for the elastic force of the first elastic member and the spring is placed coaxially with the rotating center of the blade group, the direction of the application of the biasing force of the elastic member can be always made to almost coincide with a direction of the rotation of the blades, and rotational torque accordingly can be given to the blades efficiently.

In the meantime, when installing the barrier blade group, it is necessary to define a blade chamber between two parallel planes of a barrier cover (hereinafter also referred to as a cover) and a barrier base plate (hereinafter also referred to as a base plate) placed with a certain interval in between, and to manage the positions of the respective barrier blades in the direction of the optical axis in the blade chamber, for the purpose of making the barrier blade group smoothly perform opening and closing operations while restricting the posture of the barrier blade group. With this taken into consideration, there are three conceivable layouts, as follows, when installing the barrier blades and the closing spring coaxially:

(1) to install both of the blade group and the closing spring between the cover and the base plate;

(2) to install the blade group between the cover and the base plate, as well as to install the closing spring on a part of the base plate which is closer to an image surface; and (3) to install the blade group between the cover and the base plate, as well as to install the closing spring on a part of the caver which is closer to an object.

Among them, in the case (3), the exposure of the closing spring on an external surface is not acceptable in terms of appearance quality. The provision of a member for covering the closing spring and a portion to which to fix the closing spring is not preferable, because such a member may increase the thickness of the entire barrier mechanism.

In the case (2), the blade group and the closing spring are installed separately in the direction of the optical axis by at least an amount equivalent to the thickness of the barrier base plate. The barrier base plate needs to have a certain thickness for the purpose of securing its strength, since the barrier base plate is generally formed as a resin-molded product so as to integrally form a rotating shaft of the blade group, a portion for retaining a driving member, rails for guiding slides of the blades, and so forth on the barrier base plate. For this reason, the barrier blade or the closing spring needs to have a long stretched arm in the direction of the optical axis in order for a driving force to be transmitted by bringing the closing spring and the blade group into contact with each other. The stretched arm from the barrier blade is not preferable in terms of operation stability, because such an arm increases moment for inclining the barrier blades relative to the rotating shaft upon receipt of the driving force. On the other hand, the stretched arm from the closing spring is not preferable in terms of operation stability, either, because such an arm increases moment for twisting the spring, and thus deforms the spring. Moreover, both cases are not desirable in terms of dust prevention, because: the rotation of the arm while kept in contact requires a cutout portion to be provided in the barrier base plate in a broad range for the purpose of allowing the arm to pass through: and accordingly, dust becomes easy to go into a lens tube.

In the case (1), a blade rotating shaft for retaining the closing spring and the barrier blade group is formed as a stepped boss, whose first step restricts the displacement of the closing spring in a direction at a right angle to the shaft, and whose second step, smaller in diameter than the first step, restricts the displacement of the barrier blade in the direction at a right angle to the shaft. Moreover, a position of the barrier blade group in the direction of the optical axis is restricted to the space between an end surface of the first step and an opposed surface of the barrier cover. However, the closing spring and the barrier blade group have a layout in which the closing spring and the barrier blade group are adjacently placed on a stepped rotating shaft.

In this case, a height of the blade chamber formed by the end surface of the first step and the opposed surface of the barrier cover needs to be set at a value obtained by adding a certain clearance to a total thickness of the blade group so that the barrier blades can slide smoothly. Accordingly, when a load is applied to the closing spring so as to be pressed against the shaft, the closing spring is sandwiched between the barrier blade and the end surface of the first step and the barrier blades are gathered together to the cover due to backlash. This hinders the stable operation, and makes it difficult to protect the photographic lens.

DISCLOSURE OF THE INVENTION

Problem to be Solved by the Invention

An object of the present invention is to provide a barrier mechanism capable of operating barrier blades stably and exerting excellent dust resistance, and to provide a camera and a personal digital assistance applying the barrier mechanism.

Means for Solving the Problem

For the purpose of achieving the foregoing object, a barrier mechanism of an embodiment of the present invention includes more than two barrier blades which are rotatably retained by a single spindle. The barrier mechanism includes a barrier blade group in which, out of these barrier blades, at least one barrier blade is configured to be driven to rotate, and the rest of the barrier blades are configured to rotate following the rotation of the driven barrier blade. The barrier mechanism is placed on a front face of an optical lens. The barrier mechanism is configured to establish a barrier closed state for protecting the optical lens by making the barrier blades of the barrier blade group rotationally enter an effective optical path of the optical lens, and thereby shielding the effective optical path of the optical lens. The barrier mechanism is configured to establish a barrier opened state for opening the effective optical path of the optical lens by making the barrier blades of the barrier blade group rotationally recede out of the optical path of the optical lens.

The barrier mechanism further including: an elastic member provided to the spindle substantially coaxially with a rotating center of the barrier blade group, and configured to generate torque for driving the one barrier blade to rotate; and a frame member formed of two plate-shaped members each including an aperture serving as a window for opening the effective optical path of the optical lens, and configured to house the barrier blade group and the elastic member between the two plate-shaped members.

The spindle includes a flange portion configured to separate the barrier blade group from the elastic member in a direction of an optical axis.

EMBODIMENTS OF THE INVENTION

First, a basic configuration of a barrier mechanism constituting the basis of the present invention will be described.

Figure 1:
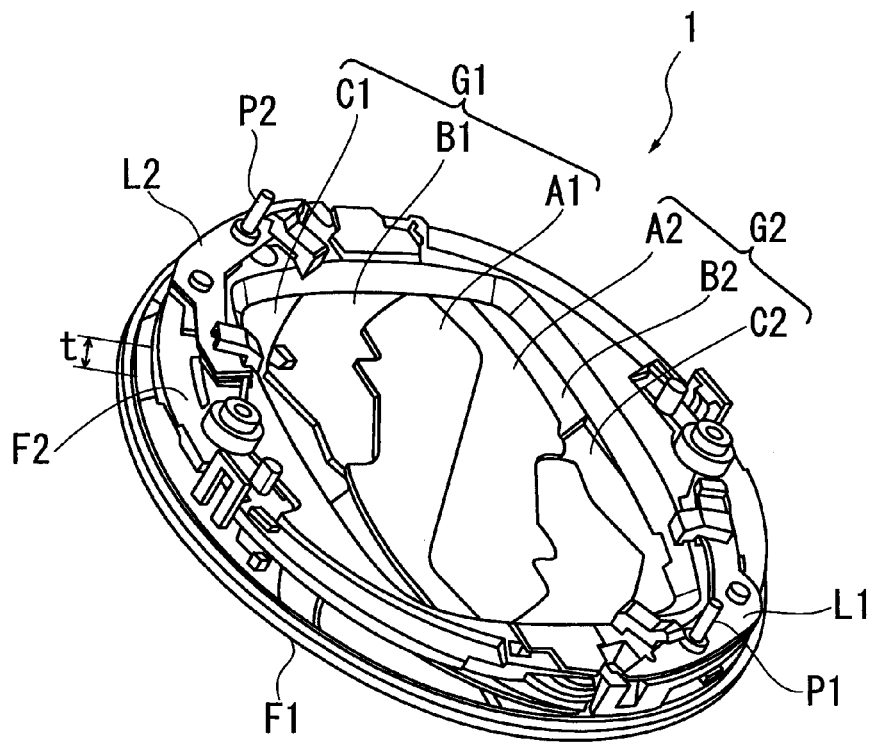
FIG. 1 is a perspective view showing a basic configuration (in a barrier closed state) of a barrier mechanism constituting the basis of the present invention.
Figure 2:
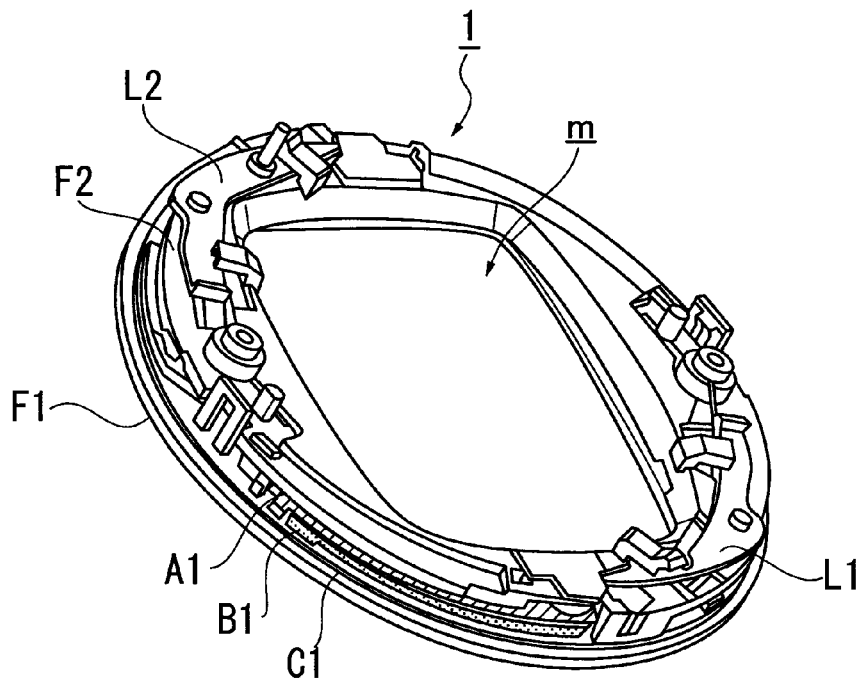
FIG. 2 is a perspective view showing a basic configuration (in a barrier opened state) of the barrier mechanism constituting the basis of the present invention.

FIG. 1 and FIG. 2 show an outline of a barrier mechanism. FIG. 1 shows the barrier mechanism put in a barrier closed state, and FIG. 2 shows the barrier mechanism put in a barrier opened state.

A barrier mechanism 1 is disposed on a front surface of an optical lens, and includes: a barrier cover F1 being a discoid-shaped frame provided with an aperture m in the center which serves as a window for opening an effective optical path of the optical lens, and located closest to an object; a barrier base plate F2 being a discoid-shaped frame provided with an aperture in the center having substantially the same shape as does the aperture m, and located closer to the optical lens than the barrier cover F1 with a certain interval t between the barrier base plate F2 and the barrier cover F1; a barrier blade group G1 including two or more barrier blades which are retained rotatably by a single spindle between the barrier cover F1 and the barrier base plate F2; and a barrier blade group G2 making a pair with the barrier blade group G1, and including two or more barrier blades which are retained rotatably by another single spindle between the barrier cover F1 and the barrier base plate F2. The barrier mechanism 1, therefore, includes at least four barrier blades. Here, descriptions will be provided by use of an example in which the barrier blade groups G1, G2 each include three barrier blades.

The barrier blade group G1 has a combination in which a barrier blade A1, a barrier blade B1, and a barrier blade C1 are arranged in this order in a direction of an optical axis of the optical lens. The barrier blade A1 is driven to rotate around the spindle in the barrier mechanism 1, while the remaining barrier blades B1, C1 rotate around the spindle, following the rotational drive of the barrier blade A1.

The barrier blade group G2 has a combination in which a barrier blade A2, a barrier blade B2, and a barrier blade C2 are arranged in this order in the direction of the optical axis of the optical lens. The barrier blade A2 is driven to rotate around another spindle in the barrier mechanism 1, while the remaining barrier blades B2, C2 rotate around the spindle, following the rotational drive of the barrier blade A2.

In this respect, a barrier closed state for shielding the effective optical path and protecting the optical lens is established (FIG. 1) by making the barrier blades A1, B1, C1, A2, B2, and C2 of the respective barrier blade groups G1 and G2 rotationally enter the effective optical path of the optical lens provided with the barrier mechanism 1. In addition, a barrier opened state in which the aperture m to open the effective optical path is formed is established (FIG. 2) by making the barrier blades A1, B1, C1, A2, B2, and C2 of the respective barrier blade groups G1 and G2 rotationally recede from the effective optical path of the optical lens. Note that both of FIG. 1 and FIG. 2 represent perspective views viewed from near the optical lens.

Because, as described above, the six or more barrier blades are provided, such a number of barrier blades overlap one another more than the barrier blades of the related art, and makes it possible to reduce the area for storing the barrier blades when set in the barrier opened state. That is to say, this makes it possible to obtain a large aperture with a smaller installation area. For example, when the six barrier blades are provided, 45% or more of a projected area in front of a lens barrel can be secured as the aperture. Further, in a case where the overlapping portions among the barrier blades are accommodated in a space along an outer edge portion of the optical lens (a convex lens) while set in the barrier opened state, effective space utilization can be achieved in a way that makes a curved surface on the lens front face included in the effective space utilization.

Next, a detailed configuration of the barrier blade groups will be described. Here, the battier blade group G1 and the barrier blade group G2 include the same configuration, as well as peripheral members concerning a barrier opening-closing mechanism and their operations are also the same between the battier blade group G1 and the barrier blade group G2. For this reason, the barrier blade group G1 and the peripheral members thereof will be described herein as an example.

Figure 3:
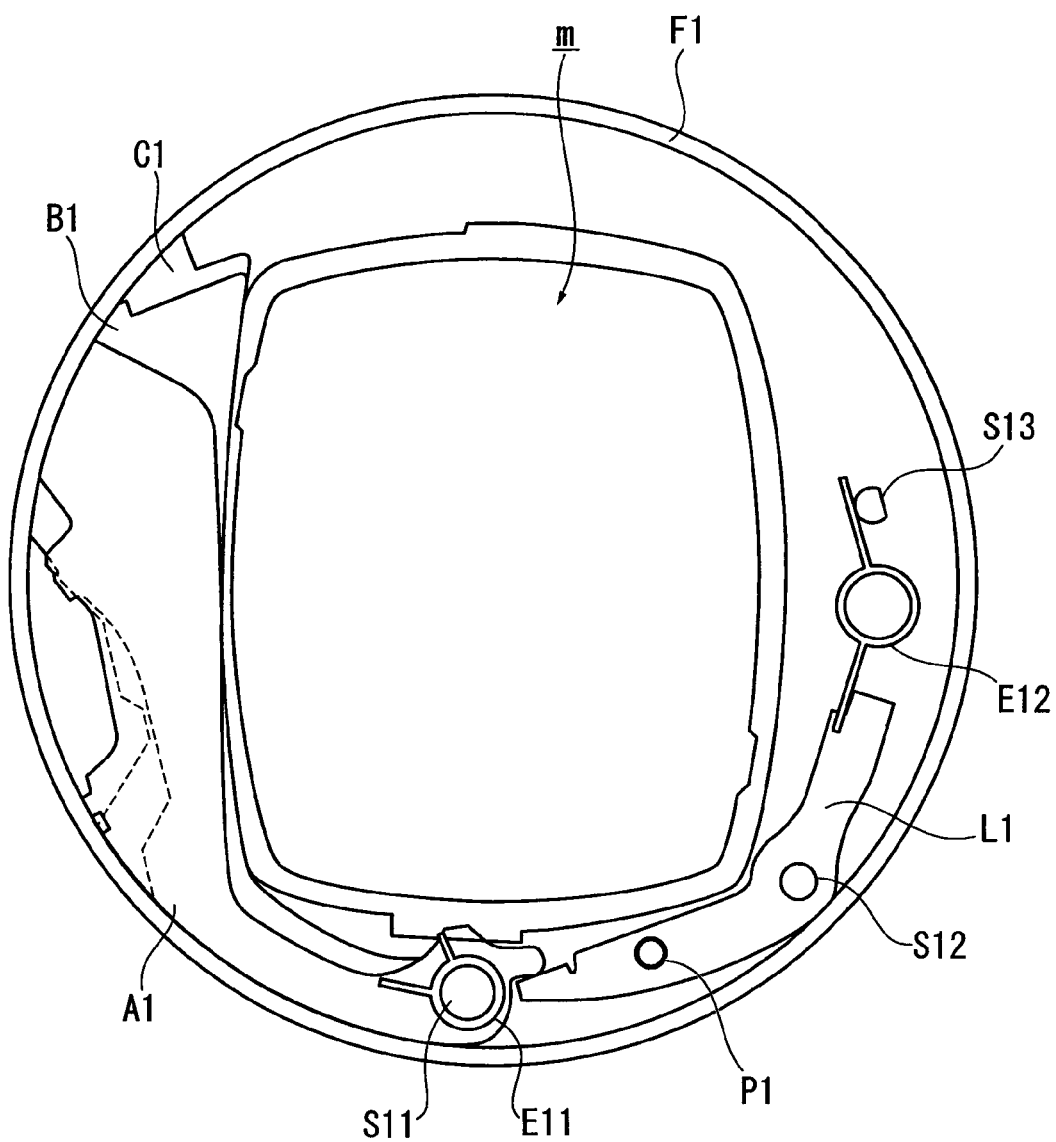
FIG. 3 is a schematic view showing a configuration of a barrier opening-closing mechanism including a barrier blade group and peripheral members.

FIG. 3 shows a configuration of a barrier opening-closing mechanism including the barrier blade group G1 and its peripheral members. This drawing illustrates how the barrier opening-closing mechanism looks when viewed from near the optical lens, and depicts only the barrier cover F1 and the barrier opening-closing mechanism concerning the barrier blade group G1 while omitting illustration of the remaining constituents.

The barrier opening-closing mechanism includes: the battier blade group G1; an elastic member E11 for rotating the barrier blade A1 in one direction; an elastic member E12 for rotating the barrier blade in a direction opposite to the direction of the rotation of the barrier blade by the elastic member E11 by applying a stronger elastic force than the elastic member E11 to the barrier blade; and a barrier driving member L1 configured to discontinue the application of the elastic force of the elastic member E12 to the barrier blade when driven by an external force.

Here, the barrier blade group G1 is rotatably retained by a single spindle S11 between the barrier cover F1 and the barrier base plate F2, and has a combination in which the metallic barrier blade A1, the molded-resin barrier blade B1, and the metallic barrier blade C1 are arranged in this order in the direction of the optical axis of the optical lens.

The elastic member E11 is a coiled spring (also referred to as a closing spring) made of a wire rod, which is attached to the spindle S11 between the barrier cover F1 and the barrier base plate F2. Both end portions of the wire rod protrude from the coil by a certain length. In addition, one end portion of the wire rod is fixed, and the other end portion thereof applies the elastic force at least to the barrier blade A1 so as to rotate the barrier blade A1 in the direction in which the barrier is closed.

The elastic member E12 is a coiled spring (also referred to as an opening spring) made of a wire rod, which has the stronger elastic force than the elastic member E11 which is attached onto the barrier base plate F2. Both end portions of the wire rod protrude from the coil by a certain length. Furthermore, one end portion of the wire rod is supported by a spindle S13, and the elastic force generated on the other end portion is applied to the barrier blade A1 via the barrier driving member L1 so as to rotate the barrier blade A2 in the direction in which the barrier is opened.

The barrier driving member L1 includes lever arms (also referred to as driving levers) which are rotatably retained by a spindle S12 on the barrier base plate F2. The barrier driving member L11 receives the elastic force of the elastic member E12 with one of the lever arms in contact with the end of the wire rod of the elastic member E12, and applies this elastic force to the barrier blade A1 (an arm a3), which is in contact with a tip bent portion of the other lever arm, in a direction in which the barrier is opened. Moreover, the barrier driving member L1 includes a pin P1 protruding toward the optical lens, which is provided on the lever arm opposite from the lever arm in contact with the wire rod of the elastic member E12.

Next, details of the barrier blades constituting the barrier blade group G1 will be described.

The barrier blade A1 is formed by subjecting a metallic plate to sheet-metal working. For example, the constituent metallic material may be stainless steel (SUS), aluminum, iron, titanium, and the like. It is desirable that a plate thickness of the barrier blade A1 should be set as thin as possible, as long as the barrier blade A1 retains rigidity as a barrier blade. The plate thickness thereof is preferably in a range of 0.2 to 0.5 mm.

Figure 4A:
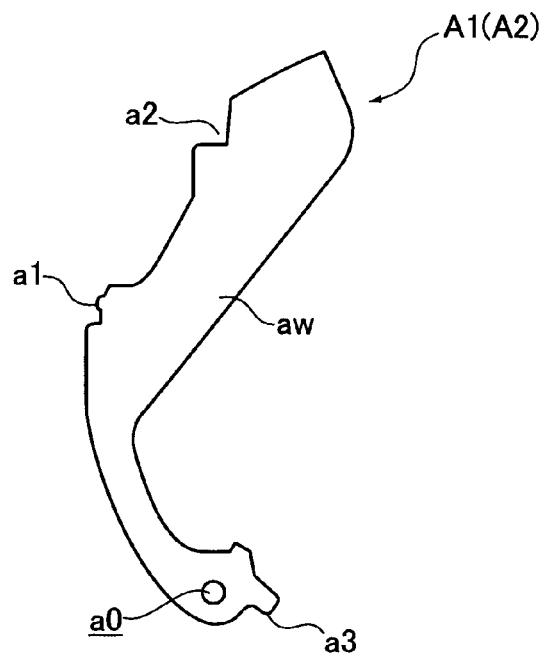
FIG. 4A is a front view showing a configuration of a barrier blade A1 (A2).
Figure 4B:
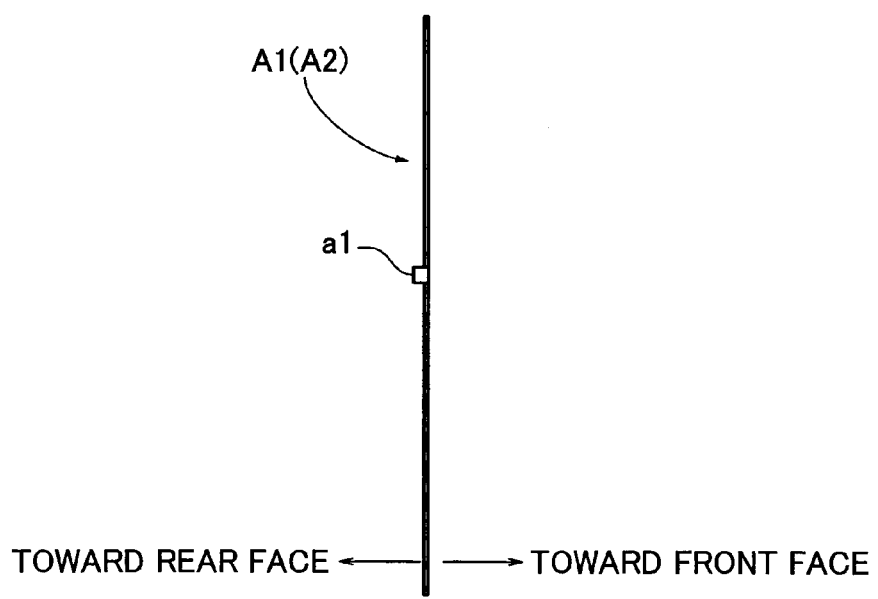
FIG. 4B is a side view showing a configuration of a barrier blade A1 (A2).

FIGS. 4A and 4B illustrate an outline of the barrier blade A1. FIG. 4A is a front view of the barrier blade A1, and FIG. 4B is a side view of the barrier blade A1.

The barrier blade A1 has a bent portional which is bent at a right angle toward the front of the optical lens, and a notched portion a2, in their respective parts of a blade portion a, constituting a portion to shield the optical lens. The bent portional is configured to apply a stress to the adjacent barrier blade B1 when closing the barrier. Meanwhile, the notched portion a2 is configured to apply the stress to the adjacent barrier blade B1 when opening the barrier.

Moreover, the barrier blade A1 has a through-hole a0 in which to penetrate the spindle S11 in a base of the blade portion $a_w$, and the arm a3 which is in contact with the tip bent portion of the lever arm of the barrier driving member L1, in a part of the blade portion $a_w$ which is opposite from the through-hole.

Next, the barrier blade B1 is the plate-shaped member molded out of resin. The constituent resin material may be generally-used molded resin (such as polycarbonate). It is desirable that a thickness of the barrier blade B1 should be set as thin as possible, as long as the barrier blade B1 retains rigidity as a barrier blade. Preferably, the plate thickness thereof is in a range of 0.5 to 1 mm.

Figure 5A:
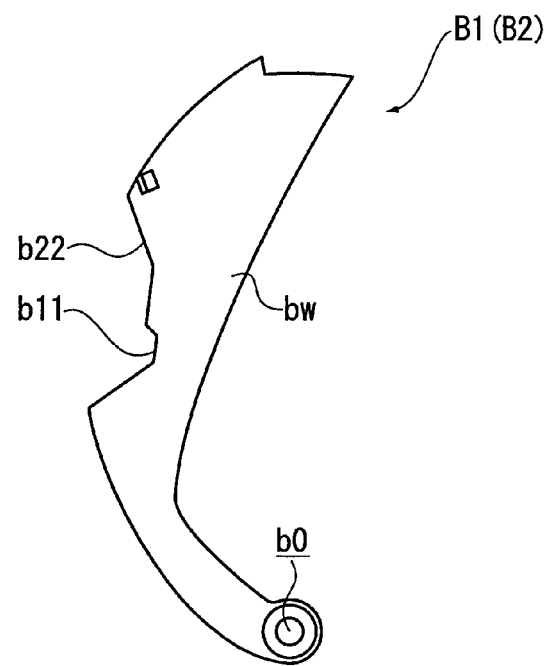
FIG. 5A is a front view showing a configuration of a barrier blade B1 (B2).
Figure 5B:
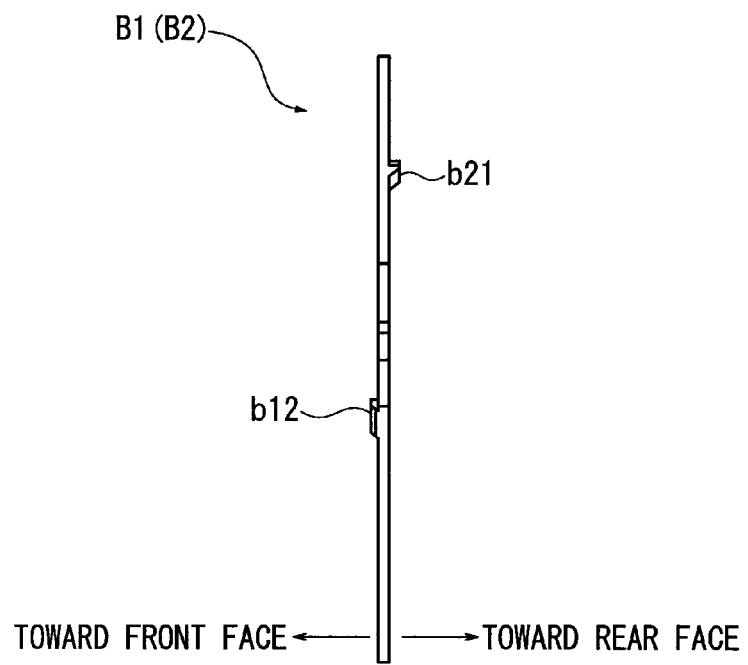
FIG. 5B is a side view showing a configuration of a barrier blade B1 (B2).

FIG. 5 shows an outline of the barrier blade B1. FIG. 5A is a front view of the barrier blade B1, and FIG. 5B is a side view of the barrier blade B1.

The barrier blade B1 has a notched end surface portion b11, a protrusion b12 protruding toward the front of the optical lens, a protrusion b21 protruding toward a rear of the optical lens, and a notched end surface portion b22, in their respective parts of a blade portion $b_w$ constituting a portion to shield the optical lens. The notched end surface portion b11 is configured to receive the stress from the barrier blade A1 when closing the barrier, and the protrusion b12 is configured to apply a stress to the adjacent barrier blade C1 when closing the barrier. In addition, the protrusion b21 is configured to receive the stress from the barrier blade A1 when opening the barrier, and the notched end surface portion b22 is configured to apply a stress to the adjacent barrier blade C1 when opening the barrier.

Moreover, the barrier blade B1 has a through-hole b0 in which to penetrate the spindle S11 in a base of the blade portion $b_w$.

Next, like the barrier blade A1, the barrier blade C1 is formed by subjecting a metallic plate, such as a stainless steel (SUS) plate, an aluminum plate, an iron plate and a titanium plate, to sheet-metal working. It is desirable that a plate thickness of the barrier blade C1 should be set as thin as possible, as long as the barrier blade C1 retains rigidity as a barrier blade. Preferably, the plate thickness thereof is in a range of 0.2 to 0.5 mm.

Figure 6A:
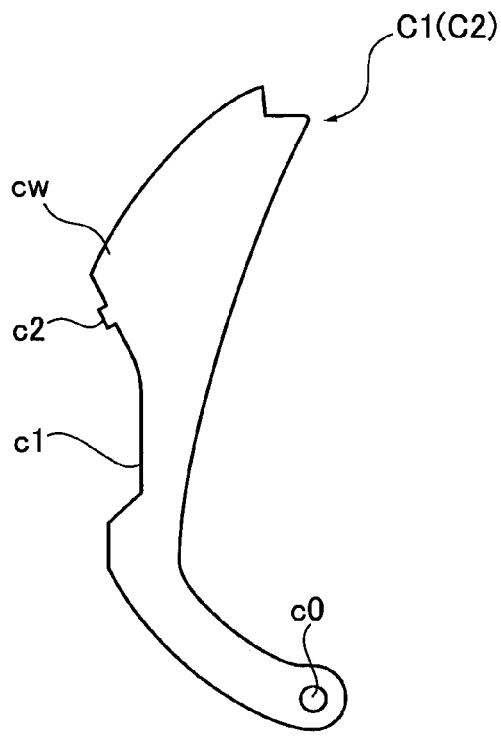
FIG. 6A is a front view showing a configuration of a barrier blade C1 (C2).
Figure 6B:
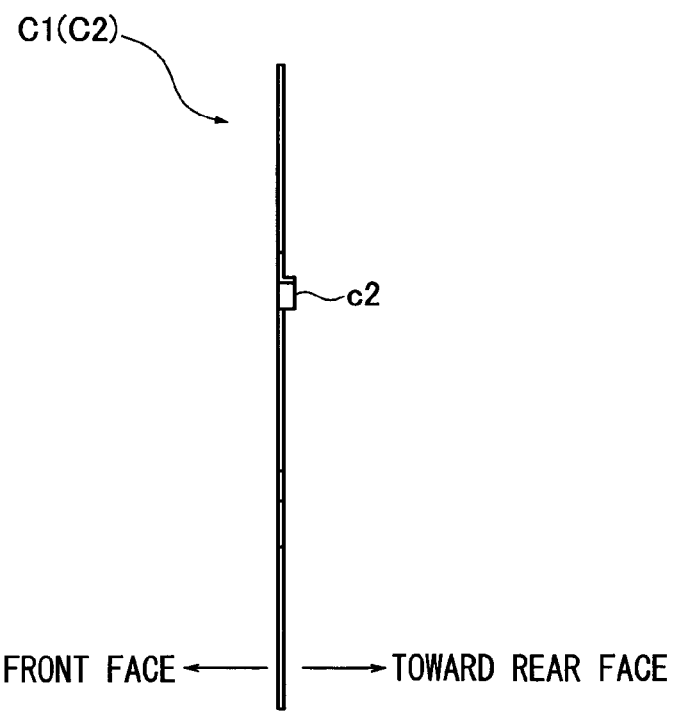
FIG. 6B is a side view showing a configuration of a barrier blade C1 (C2).

FIG. 6 shows an outline of the barrier blade C1. FIG. 6A is a front view of the barrier blade C1, and FIG. 6B is a side view of the barrier blade C1.

The barrier blade C1 has a notched portion c1, and a bent portion c2 bent at a right angle toward the rear of the optical lens, in their respective parts of a blade portion $c_w$ constituting a portion to shield the optical lens. The notched portion c1 is configured to receive the stress from the barrier blade B1 when closing the barrier. Meanwhile, the bent portion c2 is configured to receive the stress from the barrier blade B1 when opening the barrier.

The barrier opening-closing mechanism needs to drive the barrier blade A1 to rotate around the spindle S11, and then to make the barrier blades B1, C1 to rotate following the rotation of the barrier drive A1. Specifically, the barrier opening-closing mechanism needs to transmit the rotational moment (the stress) of the barrier blade A1 sequentially to the other barrier blades B1 and C1. Since the barrier blades A1, B1, and C1 are arranged in the thickness direction, the barrier blade A1 and the barrier blade B1 need to have their respective protrusions in the thickness direction for engagingly attaching the barrier blade A1 and the barrier blade B1 to each other, while the barrier blade B1 and the barrier blade C1 need to have their respective protrusions in the thickness direction for engagingly attaching the barrier blade B1 and the barrier blade C1 to each other. To be specific, out of each paired barrier blades, a protrusion in the thickness direction is provided to one barrier blade situated ahead in the direction of their rotational advancement, and a portion for receiving the protrusion is provided to the other barrier blade situated behind in the direction of the rotational advance.

In this respect, because the barrier blades of the barrier blade group G1 are arranged in the order of the metallic barrier blade A1, the molded-resin barrier blade B1 and the metallic barrier blade C1 in the direction of the optical axis of the optical lens, the barrier mechanism with this configuration can reduce the thickness in the direction of the optical axis of the optical lens as compared to a barrier mechanism with a configuration in which merely three molded-resin barrier blades are consecutively arranged, and a barrier mechanism with a configuration in which merely three metallic barrier blades are consecutively arranged.

It should be noted that the configuration of the barrier opening-closing mechanism including the barrier blade group G2 and the peripheral members is the same as the configuration of the barrier opening-closing mechanism including the barrier blade group G1 and the peripheral members which has been described above. Specifically, the barrier opening-closing mechanism includes: the barrier blade group G2; an elastic member E21 for rotating the barrier blade A2 in one direction; an elastic member E22 for rotating the barrier blade in a direction opposite to the direction of the rotation of the barrier blade by the elastic member E21 by applying a stronger elastic force than the elastic member E21 to the barrier blade; and a barrier driving member L2 configured to discontinue the application of the elastic force of the elastic member E22 to the barrier blade when driven by an external force.

Here, detailed descriptions will be provided for how the barrier mechanism 1 performs barrier opening and closing operations. Note that operations of the barrier opening-closing mechanism including the barrier blade group G1 and the peripheral members are similar to those of the barrier opening-closing mechanism including the barrier blade group G2 and the peripheral members. For this reason, the operations of the barrier opening-closing mechanism including the barrier blade group G1 and the peripheral members will be described below as the example.

(1) Operation from the Barrier Opened State (FIG. 2) to the Barrier Closed State (FIG. 1)

(S11) Since the barrier opened state is the state where no external force is applied to the barrier driving member L1, the elastic force of the elastic member E12 is applied to the arm a3 of the barrier blade A1 via the barrier driving member L1, and the barrier blades A1, B1, C1 are thus put in a state in which the moment in the rotating direction is applied to the barrier blades A1, B1, C1 to open the barrier.

(S12) Subsequently, the external force is applied to the barrier driving member L1. The time when the external force is applied to the barrier driving member L1 is the time when the optical lens provided with the barrier mechanism 1 is set into a state in which the position of the optical lens is shifted to the housed position. During this time, an external force is applied to the barrier driving member L through its operation on the other driving mechanism, or via the pin P1 alone.

Figure 7:
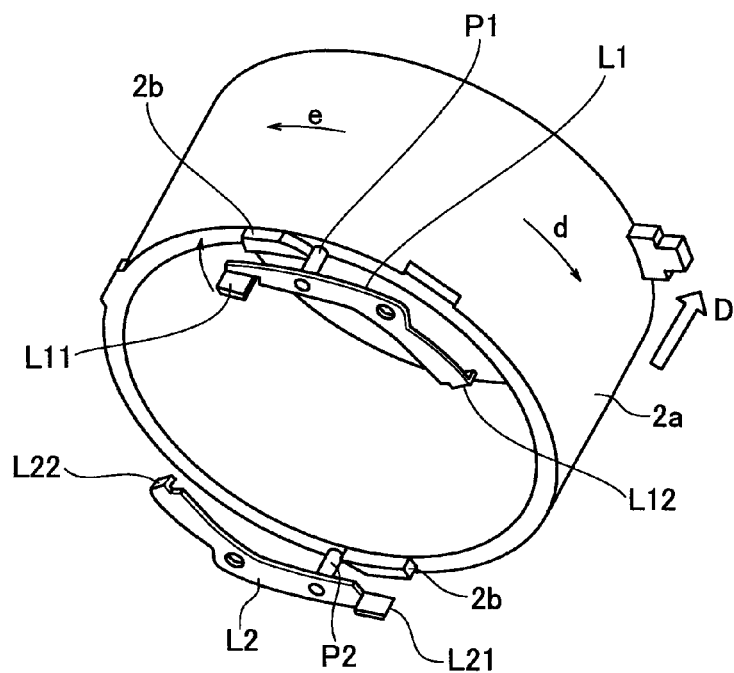
FIG. 7 is a schematic perspective view showing a state before an external force is applied to a barrier driving member.
Figure 8:
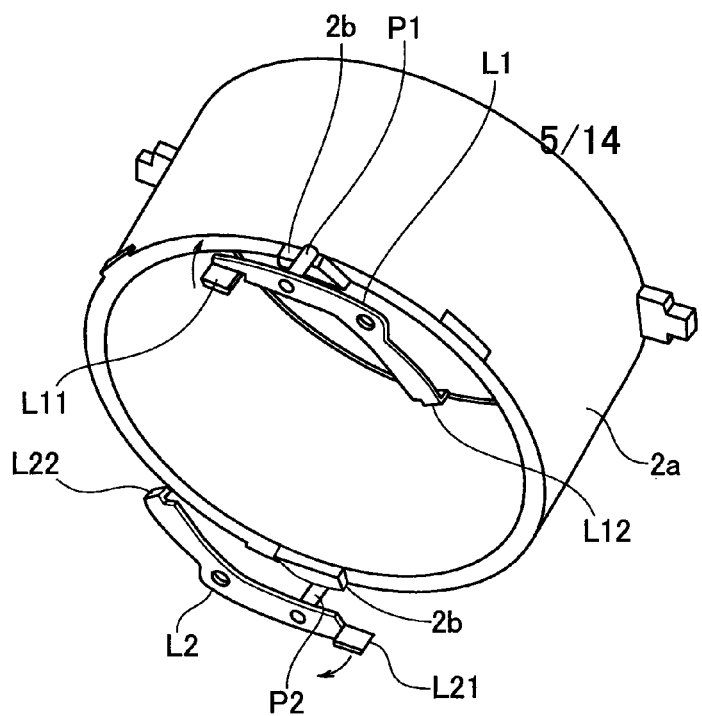
FIG. 8 is a schematic perspective view showing a state while the external force is being applied to the barrier driving member.

FIG. 7 and FIG. 8 show an example of how the external force is applied to the barrier driving member L1 (L2). FIG. 7 shows a state before the external force is applied to the barrier driving member L1 (L2), and FIG. 8 shows a state when the external force is being applied to the barrier driving member L1 (L2). In this respect, only a rotary cylinder 2a in an optical system used in an image taking device such as a camera, and the barrier driving members L1, L2 of the barrier mechanism L1 are illustrated herein.

The rotary cylinder 2a has a cylindrical shape. The rotary cylinder 2a is configured to advance forward (toward an object in the case of the camera) while revolving in a cylindrical circumferential direction (in an e direction), and thereby to push a lens barrel including the optical lens, once the image taking device is activated. Moreover, the rotary cylinder 2*a* is configured to recede in a way that makes the rotary cylinder 2*a* sink while revolving in the cylindrical circumferential direction (in a (d) direction opposite to the e direction) once the image taking device stops its operation. In addition, corresponding to the barrier driving members L1, L2, cam members 2*b* are provided on a cylinder end surface of the rotary cylinder 2*a*, which is closer to the barrier mechanism 1.

First, in FIG. 7, once the rotary cylinder 2*a* starts to recede in a way that makes the rotary cylinder 2*a* sink in conjunction with the stop of the image taking device, the rotary cylinder 2*a* revolves in the cylindrical circumferential direction (in the d direction). Concurrently, one cam member 2*b* starts a movement while turning along a perimeter of the cylinder end surface, thereby coming closer to and into contact with the pin P1 of the barrier driving member L1.

Subsequently, the rotary cylinder 2*a* is further rotated. Here, the cam member 2*b* has an inclined surface which makes the width of its front end portion become gradually larger in the thickness direction of the cylinder end surface of the rotary cylinder 2*a*. Accordingly, the pin P1 moves along this inclined surface, and receives the external force in a cylinder outward direction of the rotary cylinder 2*a*, as shown in FIG. 8. Thereby, the barrier driving member L1 receives the force in a direction against the elastic member E12, and revolves around the spindle S12, and the bent portion L11 of the barrier driving member L1 moves in a way that makes the bent portion L11 come away from the arm a3 of the barrier blade A1, thereby discontinuing the application of the elastic force of the elastic member E12 to the barrier blade A1.

(S13) In conjunction with the discontinuation of the application of the elastic force of the elastic member E12 to the barrier blade A1, the elastic force of the elastic member E11 starts to be applied to the barrier blade A1. Hence, the barrier blade A1 is driven to rotate around the spindle S11 so as to establish the barrier closed state, and begins to go into the effective optical path of the optical lens.

(S14) As the barrier blade A1 rotates, the bent portion a1 of the barrier blade A1 hooks on the notched end surface portion b11 of the barrier blade B1. Since the barrier blade A1 rotates further, the rotational moment is transmitted to the barrier blade B1, whereby the barrier blade B1 begins to rotate around the spindle S11 and begins to go into the effective optical path of the optical lens.

(S15) As the barrier blade B1 rotates, the protrusion b12 of the barrier blade B1 hooks on the notched portion c1 of the barrier blade C1. Since the barrier blades A1, B1 rotates further, the rotational moment is transmitted to the barrier blade C1, whereby the barrier blade C1 begins to rotate around the spindle S11 and begins to go into the effective optical path of the optical lens.

Figure 9:
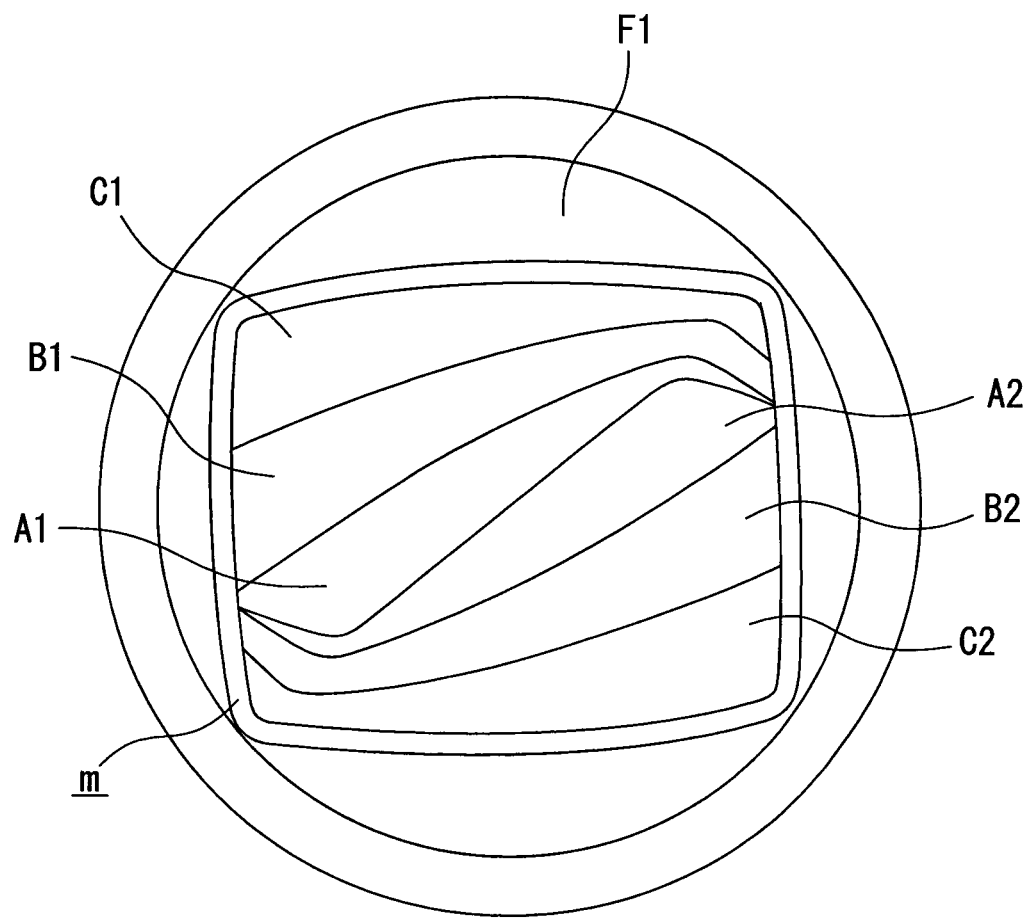
FIG. 9 is a schematic plan view showing a state where an aperture of the barrier mechanism is shielded by the barrier blades.

(S16) Eventually, the barrier blades A1, B1, C1 shield the effective optical path of the optical lens. Similar operations also take place in the barrier blade group G2, and the aperture m of the barrier mechanism 1 is completely shielded by the barrier blades A1, A2, B1, B2, C1, C2 (FIG. 9).

(1) Operation from the Barrier Closed State (FIG. 1) to the Barrier Opened State (FIG. 2)

(S21) In FIG. 8, once the rotary cylinder 2*a* starts to advance in conjunction with the activation of the image taking device, the rotary cylinder 2*a* rotates in the cylindrical circumferential direction (in the e direction being opposite to the d direction), and the cam member 2*b* also starts a movement in a way that makes the cam member 2*b* turn along the perimeter of the cylinder end surface, thereby coming away from the pin P1 of the barrier driving member L1.

(S22) As the cam member 2*b* comes away from the pin P1 of the barrier driving member L1, the application of the external force to the barrier driving member L1 ceases. Accordingly, the elastic force of the elastic member E12 starts to be applied to the arm a3 of the barrier blade A1 via the barrier driving member L1.

Figure 10:
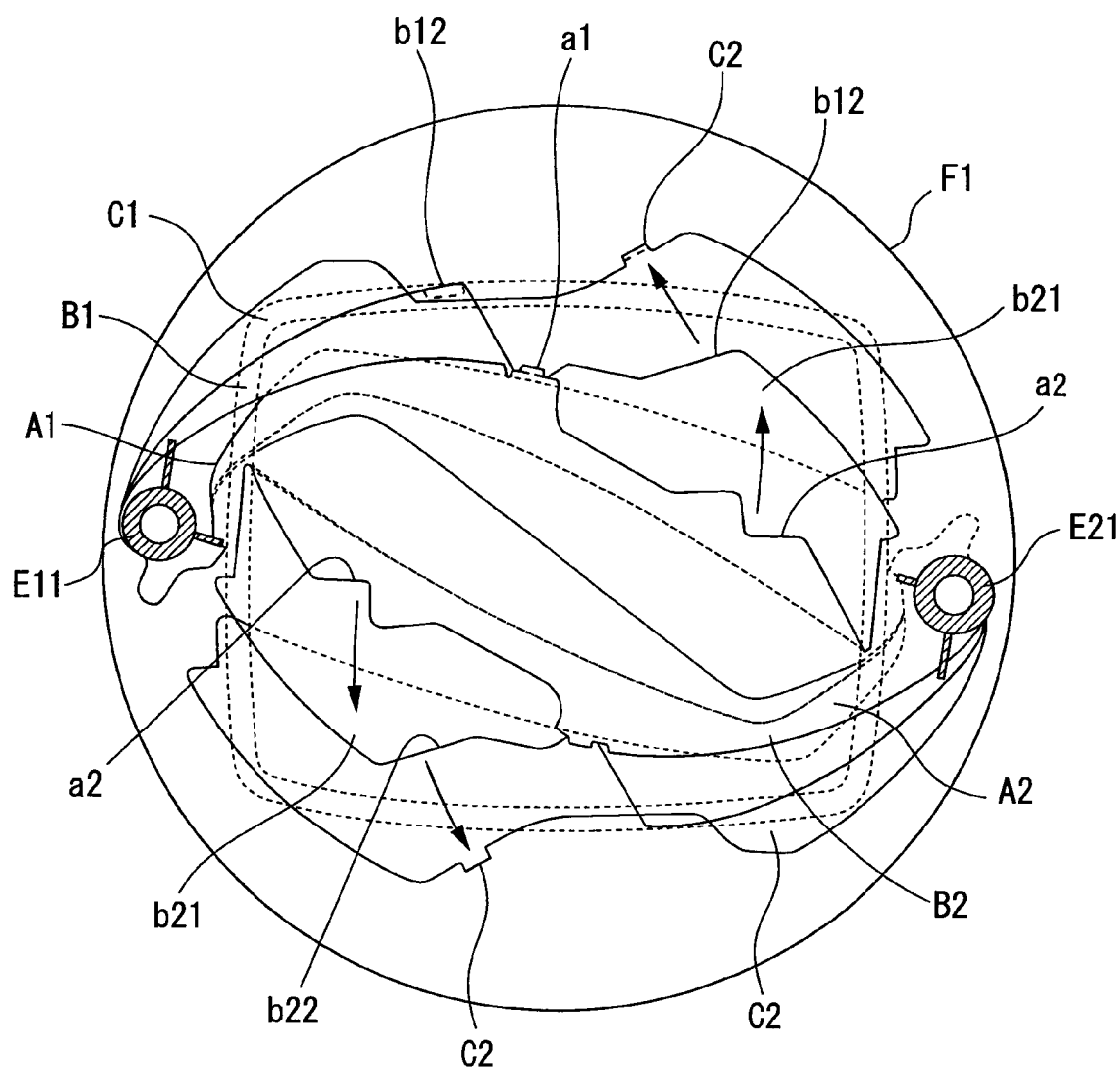
FIG. 10 is a plan view for explaining how the barrier blades in the barrier mechanism of the present invention operate.

(S23) Subsequent operations of the barrier blades will be described by using FIG. 10. FIG. 10 shows configurations of the barrier blade group G1 and the elastic member E11, as well as the barrier blade group G2 and the elastic member E21, in the barrier closed state, which are located on the barrier cover F1.

The elastic force of the elastic member E12 is applied against the elastic force of the E11, and the elastic force of the elastic member E12 is stronger than the elastic force of the elastic member E11. As a consequence, the barrier blade A1 is driven to rotate around the spindle S11 so as to establish the barrier opened state, and starts to recede from the effective optical path of the optical lens.

(S24) As the barrier blade A1 rotates, the notched portion a2 of the barrier blade A1 comes into contact with the protrusion b21 of the barrier blade B1. Since the barrier blade A1 rotates further, the rotational moment is transmitted to the barrier blade B1, whereby the barrier blade B1 begins to rotate around the spindle S11 and begins to recede from the effective optical path of the optical lens.

(S25) As the barrier blade B1 rotates, the notched portion b22 of the barrier blade B1 comes into contact with the bent portion c2 of the barrier blade C1. Since the barrier blades A1, B1 rotate further, the rotational moment is transmitted to the barrier blade C1, whereby the barrier blade C1 begins to rotate around the spindle S11 and begins to recede from the effective optical path of the optical lens.

(S26) Eventually, the barrier blades A1, B1, C1 recede from the effective optical path of the optical lens, and the aperture m is formed (FIG. 2). Furthermore, the three barrier blades A1, B1, C1 are housed in the space between the barrier cover F1 and the barrier base plate F2 in an overlapping state.

It should be noted that in the barrier mechanism with this configuration, the barrier blade groups G1, G2 (the barrier blades A1, A2, the barrier blades B1, B2, and the barrier blades C1, C2), the elastic members E11, E21, the elastic members E12, E22, and the barrier driving members L1, L2 are respectively located symmetrically with respect to a center point of the barrier mechanism 1.

Because in this way, all of the corresponding barrier blades, the corresponding elastic members, and the corresponding barrier driving members between the two barrier opening-closing mechanisms are arranged in their point-symmetric positions, all mechanical balance as the entire barrier mechanism is improved, as well as the dimensional variation and backlash among the components are equalized. This makes the drive of the barrier opening-closing mechanisms well-balanced, and accordingly makes it possible to increase stability and reliability in terms of shielding the effective optical path of the optical lens.

With regard to the barrier mechanism as described above, a structure as shown in FIG. 11 is generally employed for the spindles each for holding a barrier blade group and a closing spring (for example, the spindle S11 for holding the barrier blade group G1 and the elastic member E11) between the barrier cover F1 and the barrier base plate F2.

Figure 11:
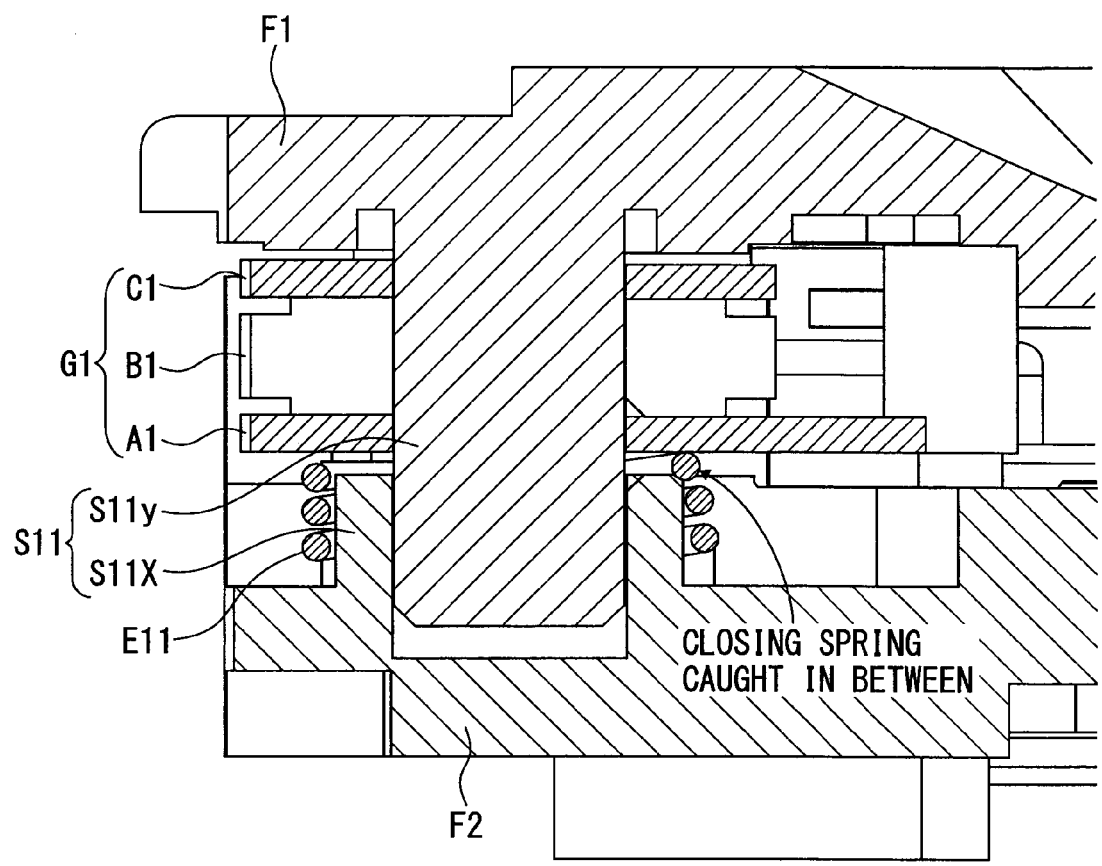
FIG. 11 is a cross-sectional view showing a typical configuration of a spindle for holding a barrier blade group and an elastic member serving as a closing spring in the barrier mechanism shown in FIG. 1.

Specifically, as shown in FIG. 11, the spindle S11 includes: a perforated boss portion S11*x* in a cylindrical shape provided on the barrier base plate F2; and a shaft member S11*y* in a pin shape provided on the barrier cover F1, and configured to cause a tip end thereof to be inserted in a hole of the perforated boss portion S11x, for the purpose of making their assembly easy.

In this respect, the barrier blade group G1 and the elastic member E11 are disposed in a state of being arranged in the direction of the optical axis between the barrier cover F1 and the barrier base plate F2 for the purpose of reducing a distance between the two constituents in the direction of the optical axis as small as possible. Moreover, the barrier blade group G1 and the elastic member E11 are coaxially held by the spindle S11 for the purpose of effectively giving rotating torque to the barrier blade A1 by making the direction of the application of the biasing force of the elastic member E11 always substantially coincide with the direction of the rotation of the barrier blade A1. To be precise, the elastic member E11 is retained by the perforated boss portion S11x with a cylinder of the perforated boss portion S11x fitted in an inner peripheral portion of the coil, and the barrier blade group G1 is retained by the shaft member S11y with the shaft member S11y, which has a smaller diameter than an outer periphery of the perforated boss portion S11x, inserted in the through-holes a0, b0, and c0 of the barrier blade group G1.

In this case, a height of a blade chamber to be defined by an upper end surface of the perforated boss portion S11x and an opposed surface of the barrier cover F1 is equal to the sum of the total thickness of the barrier blade G1 and a clearance in a range from about 0.1 to 0.2 mm, for example, which is added in order to make the barrier blades A1, B1, C1 smoothly.

However, when a load is applied to the elastic member E11 and the elastic member is pressed against the perforated boss portion S11x, it is likely in some case that: the elastic member E11 deforms in a way that pushes the barrier blade group G1 toward the barrier cover F1 (upward in the drawing) (deforms accompanied with gathering due to backlash); and part of the elastic member E11 is caught between the barrier blade A1 and the upper end surface of the perforated boss portion S11x (hereinafter referred to as "catching the closing spring") (FIG. 11).

The predetermined clearance of the blade chamber disappears if "catching the closing spring" takes place. Accordingly, smooth rotation of the barrier blades A1, B1, C1 is hindered, and the barrier blade group G1 is hard to close even while the lens tube is put in a housed state, for example. This makes it difficult to protect a photographic lens.

The present invention is characterized in that the above-described barrier mechanism is improved so that the barrier blades A1, B1, C1 can rotate smoothly; and to this end, the spindle (the spindle S11) includes a flange portion configured to separate the barrier blade group (the barrier blade group G1) from the elastic member (the elastic member E11) in the direction of the optical axis. An embodiment thereof will be described below.

Figure 12A:
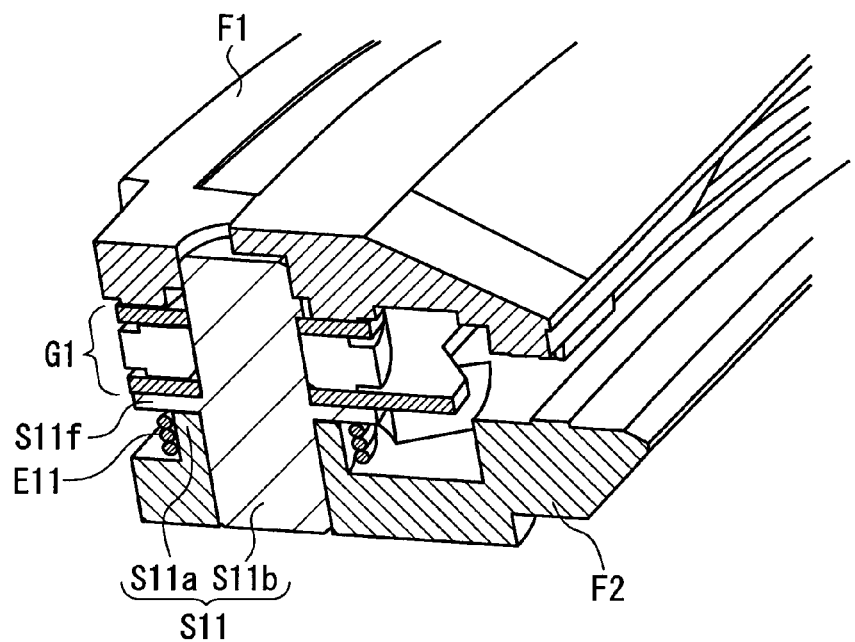
FIG. 12A is a cross-sectional perspective view showing a configuration of a spindle for holding a barrier blade group and an elastic member serving as a closing spring in the barrier mechanism of the present invention.
Figure 12B:
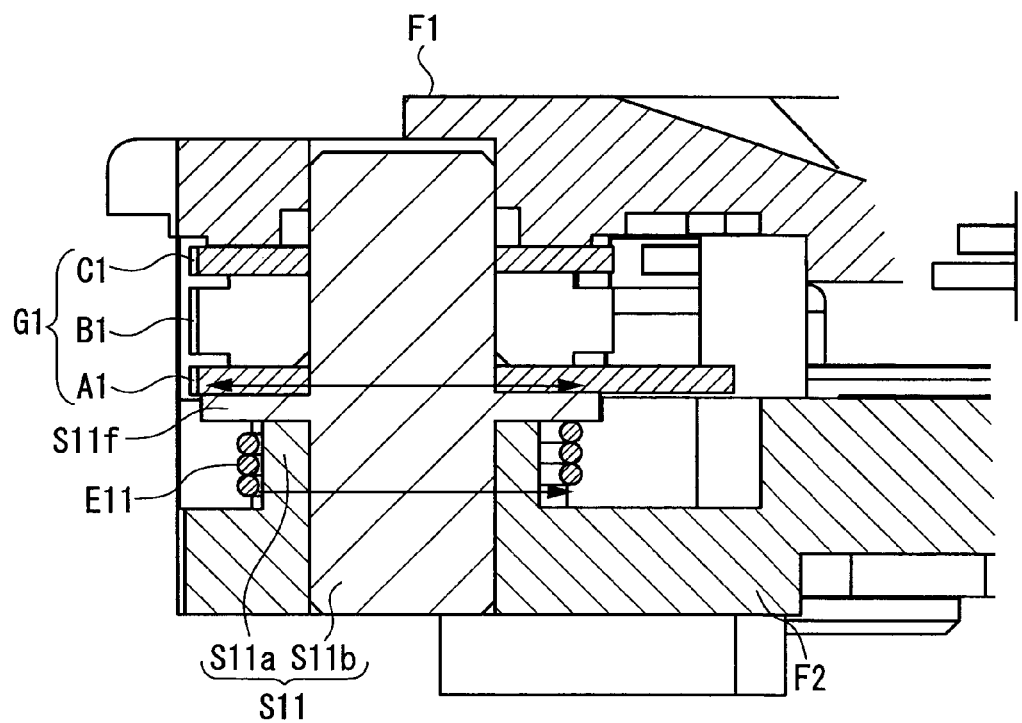
FIG. 12B is a cross-sectional side view showing a configuration of a spindle for holding a barrier blade group and an elastic member serving as a closing spring in the barrier mechanism of the present invention.

FIG. 12 is a cross-sectional view showing a configuration of a spindle for holding a barrier blade group and an elastic member serving as a closing spring in the barrier mechanism of the present invention. FIG. 12(a) is a perspective view thereof, and FIG. 12(b) is a cross-sectional view thereof.

As shown in FIG. 12, the spindle S11 is installed upright on one plate-shaped member (the barrier base plate F2 in this case) out of the two plate-shaped members (the barrier cover F1 and the barrier base plate F2), and is provided with: a perforated boss portion S11a in a cylindrical shape for retaining the elastic member E11 on an outer peripheral side; and a shaft member S11b configured to retain the barrier blade group G11 while inserted in a hole of the perforated boss portion S11a. A flange portion S11f is provided on the shaft member S11b.

Specifically, the perforated boss portion S11a is provided on the barrier base plate F2, protruding toward the barrier cover F1, in almost the same manner as is that of the configuration in FIG. 11. The elastic member E11 is held with the coil of the elastic member E11 fitted to the outer periphery of the cylinder.

Meanwhile, the shaft member S11b is formed of: a columnar shaft body; and the flange portion S11f in a collar shape (or a discoid shape) provided substantially in the center of this shaft in a longitudinal direction (an axial direction). The shaft member S11 holds the barrier blades A1, B1, C1 with one of the two shaft portions, into which the shaft member S11b is divided by the flange portion S11f, inserted in the through-holes a0, b0, and c0 of the respective barrier blades A1, B1, C1, and offers the one shaft portion as a rotating shaft of the barrier blades A1, B1, C1.

Figure 13:
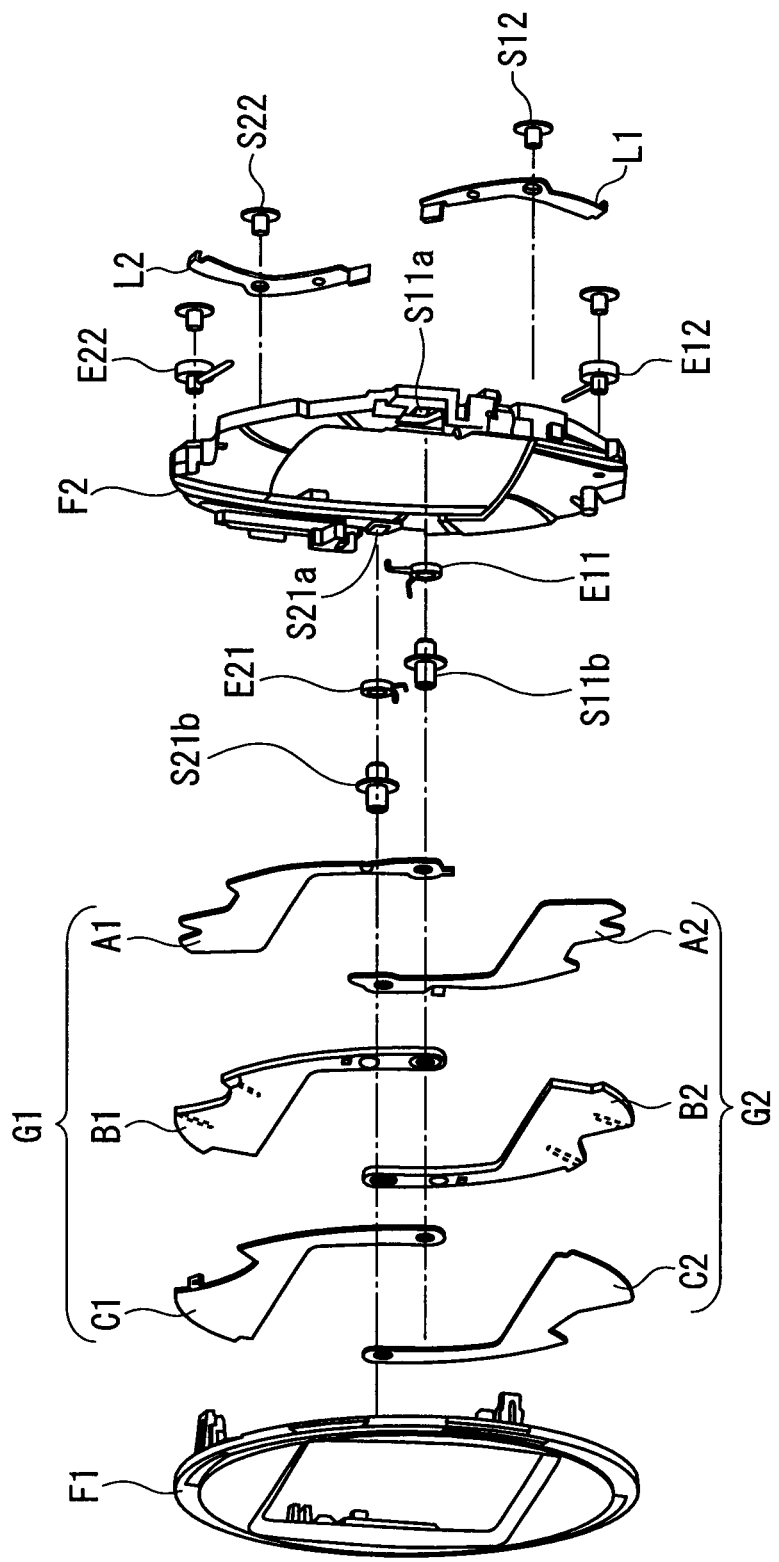
FIG. 13 is an exploded view showing an overall configuration of the barrier mechanism of the present invention.

FIG. 13 is an exploded view of the barrier mechanism. A layout of the barrier mechanism 1 in the opened state is displayed in an exploded manner. The barrier blade group G1 and the peripheral members will be described herein as the example. The barrier blade group G2 includes the same configuration, and the peripheral members concerning the barrier opening-closing mechanism and their operations are also the same.

When assembling the barrier mechanism 1, the elastic member E11 is firstly fitted to the perforated boss portion S11a on the barrier base plate F2. Meanwhile, on the opposite surface of the barrier base plate F2, the barrier driving member L1 and the elastic member E12 is fixed by using the spindle S12 and the like.

Next, one shaft end portion of the shaft member S11 is press-fitted into the hole of the perforated boss portion S11a, and the different shaft end portion is inserted in the through-holes a0, b0, c0 of the respective barrier blades A1, B1, C1. Subsequently, the different shaft end portion is inserted to a hole (or a recess portion) provided on the barrier cover F1, and the barrier cover F1 and the barrier base plate F2 are fitted together. Hence, the barrier mechanism 1 is finished.

At this time, a position of the shaft member S11b in the direction of the optical axis in the space between the barrier cover F1 and the barrier base plate F2 is determined by making the flange portion S11f in contact with an upper end surface of the perforated boss portion S11a.

Specifically, in the barrier mechanism 1, as shown in FIG. 12, the blade chamber is formed by using the flange portion S11f and the opposed surface of the barrier cover F1. The height of the blade chamber is secured by adding the clearance in the range of about 0.1 to 0.2 mm, for example, to the total thickness of the barrier blade group G1 in order to make the barrier blades A1, B1, C1 rotate smoothly. At this time, the flange portion S11f is in intimate contact with the upper end surface of the perforated boss portion S11a, and bulges as a ceiling for the coil of the elastic member E11. Accordingly, even though the load is applied to the elastic member E11, the flange portion S11f restricts the displacement of the elastic member E11 in the direction of the optical axis. Hence, the flange portion S11f prevents part of the elastic member E11 from riding onto the upper end surface of the perforated boss portion S11a. For this reason, the predetermined height of the blade chamber is always secured, and the smooth rotation of the barrier blades A1, B1, C1 is achieved. Hence, the barrier mechanism 1 can protect the photographic lens securely.

Meanwhile, it is preferable that an outer peripheral diameter (a flange diameter) of the flange portion S11f be larger than a coil diameter (a winding diameter) of the elastic member E11. Thereby, the position of the elastic member E11 in the direction of the optical axis is restricted to the space between a receiving surface of the barrier base plate F2 and a lower surface of the flange portion S11f of the shaft member S11b. Hence, the "catching the closing spring" as shown in FIG. 11 can be prevented securely.

Meanwhile, it is preferable that a thickness of the flange portion S11f be as thin as possible in order to reduce a distance in the direction of the optical axis between the barrier blade group G1 and the elastic member E11. Since the shaft member S11b can be formed as a separate member from the barrier cover F1 or the barrier base plate F2, the thickness of the flange portion S11f can be reduced within a range not affecting the required strength by forming the shaft member as a metal component obtained through a cutting process by a lathe, for example. Hence, it is possible to achieve the thickness of around 0.2 mm, for instance.

On the contrary, if a configuration for preventing the closing spring from being caught would be achieved, for example, by placing the closing spring on a lower surface (a surface closer to the optical lens) of the barrier base plate F2 and providing the barrier base plate F2 between the barrier blade group G1 and this closing spring, the barrier base plate F2 needs to have a thickness of about 0.8 mm, for example, in order to ensure the strength, because the barrier base plate F2 is generally formed as a resin-molded component so as to integrally form a portion for retaining the driving member, rails for guiding the slide of the barrier blades, and for forth in the barrier base plate F2. As a result, the distance in the direction of the optical axis between the barrier group G1 and the closing spring is increased. This is disadvantageous to stabilizing the operations of the barrier blade group G1.

Figure 14:
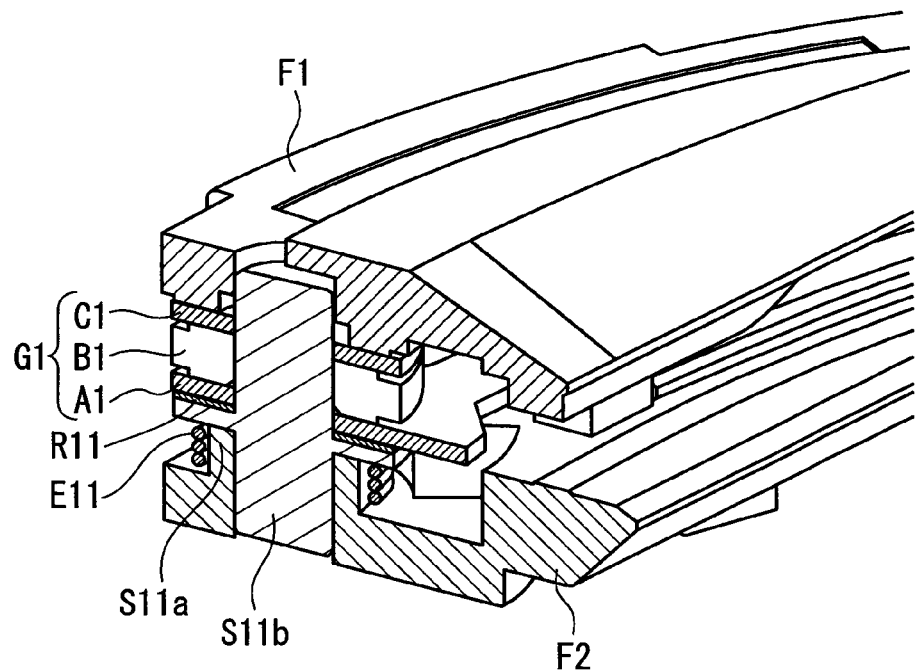
FIG. 14 is a cross-sectional perspective view showing a configuration of a first application of the barrier mechanism of the present invention.

FIG. 14 shows a first application of the barrier mechanism of the present invention.

In this application, as shown in FIG. 14, a sliding ring R11 rotatably retained by the spindle S11, or more specifically, by the shaft member S11b, is provided between the flange portion S11f and the barrier blade group G1. The rest of the configuration is the same as the rest of the configuration shown in FIG. 12. Thereby, the barrier blade A1 contacts the sliding ring R11 that is configured to be driven by the rotation of the barrier blade A1 without directly contacting the flange portion S11f of the shaft member S11b. Accordingly, frictional resistance between the two components is reduced, and the barrier blade group G1 can perform its opening and closing operations more smoothly.

In addition, it is preferable that the sliding ring R11 possess a lubricating property. For example, the sliding ring R11 may be a molded product made of lubricating resin, or a sheet material having the lubricating property. Thereby, the friction resistance between the barrier blade A1 and the sliding ring R11 is further reduced, and the barrier blade group G1 can perform the opening and closing operations much more smoothly.

Furthermore, the sliding ring R11 can be formed with a thickness in a range of about 0.05 mm to 0.1 mm, for example, when using the aforementioned materials (the molded product made of the lubricating resin and the sheet material having the lubricating property). Even the total of the thickness of the sliding ring R11 and the thickness of the flange portion S11f can be limited to approximately 0.3 mm. Accordingly, it is possible to maintain the effect of the present invention, that is to say, the effect of enhancing the operating stability by installing the elastic member E11 and the barrier blade group G1 as closely as possible in the direction of the optical axis.

Figure 15:
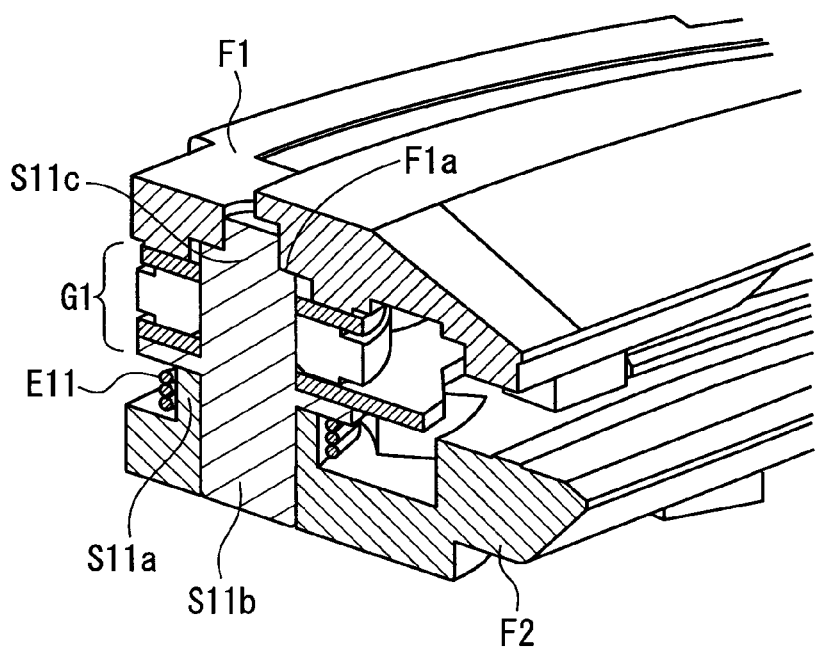
FIG. 15 is a cross sectional perspective view showing a configuration of a second application of the barrier mechanism of the present invention.

FIG. 15 shows a second application of the barrier mechanism of the present invention.

In this application, as shown in FIG. 15, one end portion (which is an upper shaft end portion close to the barrier cover F1 in FIG. 15) of the shaft member S11b in an axial direction abuts on the barrier cover F1 which constitutes the other plate-shaped member out of the two plate-shaped members. To be more precise, the one end portion of the shaft member S11b in the axial direction has a stepped portion S11c, and the stepped portion S11c is fitted in a recess portion F1a provided on the barrier cover F1.

Thereby, a shoulder portion of the stepped portion S11c abuts on a corresponding surface of the recess portion F1a, whereby a height position of the barrier cover F1 relative to the flange portion S11f is defined only by using the two components, namely, the shaft member S11b and the barrier cover F1, regardless of the dimensional precision of the barrier base plate F2. Hence, it is possible to accurately manage the predetermined height of the blade chamber to be defined between the flange portion S11f and the corresponding surface of the barrier cover F1, i.e., the height to be defined by adding the clearance for allowing the smooth rotation of the barrier blades A1, B1, C1 to the total thickness of the barrier blade group G1.

Next, a camera according to the present invention will be described.

The camera of the present invention is characterized by including: an image taking device including photographic optical lenses; and the above-described barrier mechanism of the present invention to be placed on a photographic optical lens which is located closest to an object among the photographic optical lenses.

Figure 16:
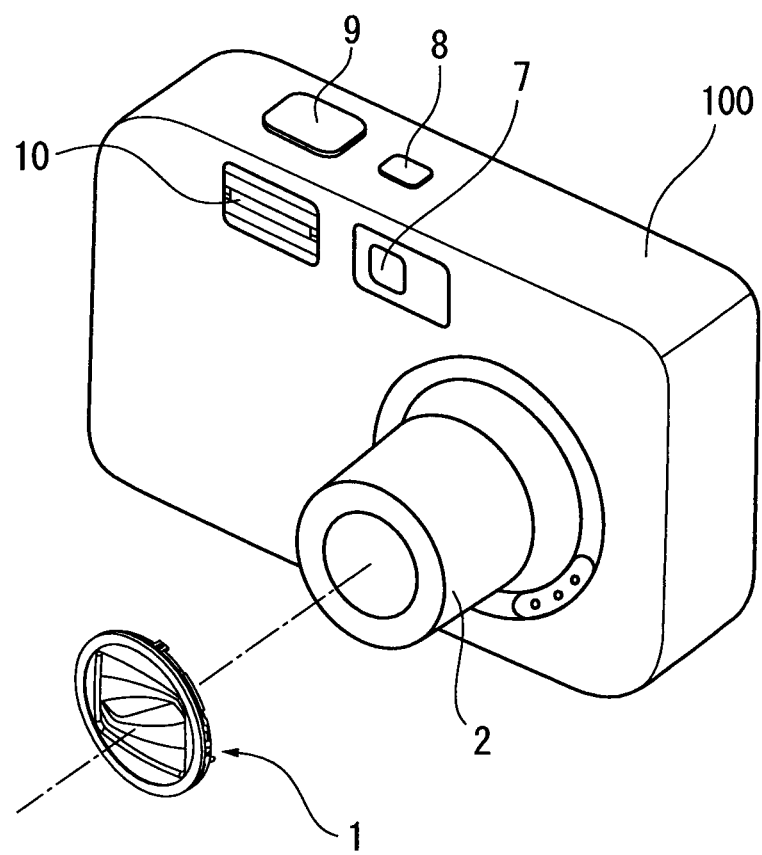
FIG. 16 is a schematic diagram showing a configuration of a camera to which the barrier mechanism according to the present invention is applied.

FIG. 16 shows an example of a configuration of the camera of the present invention.

The camera of this embodiment is a compact camera provided with a retractable lens tube (of a type in which the lens barrel is stored in the inside of a main body while in a non-photographic state). In the drawing, reference numeral 100 denotes a camera main body. A lens unit 2 configured to capture image information is integrally provided to the camera main body 100. Moreover, the barrier mechanism 1 of the present invention is provided on a front face of the lens unit 2.

A ranging unit 7 for measuring a distance to a photographic subject is opened on the camera main body 100, and a flash unit 10 for photographing in the dark is also provided. In addition, a release button 9 for photographing, and a power button 8 for activating and turning off the camera main body 100 are provided.

In the camera of the present invention, once the power button 8 is pressed for activation, the lens barrel advances in the lens unit 2, and the barrier opening operations are executed in accordance with steps S21 to S26 described above. Hence, the barrier mechanism 1 is set in the barrier opened state, and the camera becomes ready for photographing.

Furthermore, once the power button 8 is pressed for turning off, the lens barrel recedes while sinking in the lens unit 2, and is housed in the inside of the camera main body 100. Concurrently, the barrier closing operations are executed in accordance with steps S11 to S16 described above. Hence, the barrier mechanism 1 is set in the barrier closed state.

Smooth barrier opening and closing operations are performed by the barrier mechanism 1 of the present invention.

Next, a mobile information terminal of the present invention will be described.

The mobile information terminal of the present invention is characterized by including: an image taking device including photographic optical lens; and the barrier mechanism of the present invention to be placed on a photographic optical lens which is located closest to a photographic subject among the photographic optical lenses.

Figure 17:
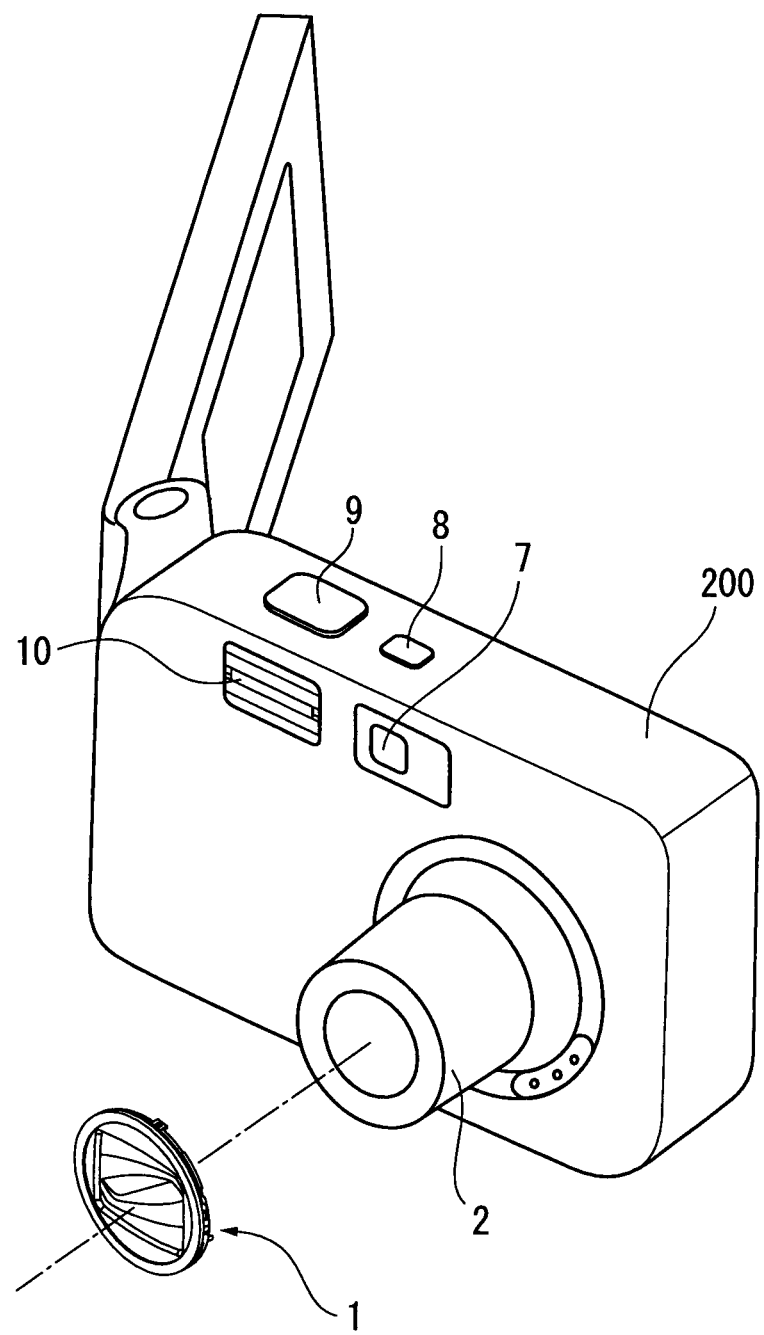
FIG. 17 is a schematic diagram showing a configuration of a mobile information terminal according to the present invention.

FIG. 17 illustrates an example of a configuration of the mobile information terminal of the present invention.

As a mobile information terminal main body 200, the mobile information terminal of this embodiment includes: a part having the same configuration as does the camera shown in FIG. 16; and a part including a section (not shown) through which to input information and a liquid crystal screen for displaying the information. Both of the parts are foldably connected to each other. Moreover, the barrier mechanism 1 of the present invention is provided on a front face of the lens unit 2.

In the mobile information terminal of the present invention, as well, once the power button 8 is pressed for activation, the lens barrel advances in the lens unit 2, and the barrier opening operations are executed in accordance with steps S21 to S26 described above. Hence, the barrier mechanism 1 is set in the barrier opened state, and the mobile information terminal becomes ready for photographing.

Moreover, when the power button 8 is pressed for turning off, the lens barrel recedes while sinking in the lens unit 2, and is housed in the inside of the mobile information terminal main body 200. Concurrently, the barrier closing operations are executed in accordance with steps S11 to S16 described above. Hence, the barrier mechanism 1 is set in the barrier closed state.

Smooth barrier opening and closing operations are performed by the barrier mechanism 1 of the present invention.

Although the foregoing descriptions have been provided for the present invention on the basis of the illustrated embodiments, the present invention is not limited only to these embodiments, and may be modified into other embodiments within the scope of the invention.

RELATED ART DOCUMENTS

Patent Documents

[Patent Document 1] Japanese Patent Application Publication No. 2007-102086

This application claims the benefit of priority based on the prior Japanese Patent Application No. 2010-225614 filed on Oct. 5, 2010, the entire contents of which are incorporated herein by reference.

The invention claimed is:

1. A barrier mechanism including a barrier blade group having at least two barrier blades which are rotatably retained by a single spindle, at least one barrier blade among the barrier blades being configured to be driven to rotate, and the rest of the barrier blades being configured to rotate following the rotation of the driven barrier blade,
the barrier mechanism placed on a front face of an optical lens,
the barrier mechanism configured
to establish a barrier closed state for protecting the optical lens by making the barrier blades of the barrier blade group rotationally enter an effective optical path of the optical lens, and thereby shielding the effective optical path of the optical lens, and
to establish a barrier opened state for opening the effective optical path of the optical lens by making the barrier blades of the barrier blade group rotationally recede out of the optical path of the optical lens,
the barrier mechanism comprising:
an elastic member provided to the spindle substantially coaxially with a rotating center of the barrier blade group, and configured to generate torque for driving the one barrier blade to rotate; and
a frame member formed of two plate-shaped members each including an aperture serving as a window for opening the effective optical path of the optical lens, and configured to house the barrier blade group and the elastic member between the two plate-shaped members,
wherein the spindle includes a flange portion configured to separate the barrier blade group from the elastic member in a direction of an optical axis.

2. The barrier mechanism according to claim 1, wherein the spindle is installed upright on one plate-shaped member out of the two plate-shaped members,
the spindle is formed of: a cylinder-shaped perforated boss portion configured to retain the elastic member on its outer periphery; and a shaft member configured to retain the barrier blade group while inserted in a hole of the perforated boss portion, and
the flange portion is provided on the shaft member.

3. The barrier mechanism according to claim 2, wherein a thickness of the flange portion is thinner than the two plate-shaped members.

4. The barrier mechanism according to claim 2, wherein one end of the shaft member in an axial direction abuts on the other plate-shaped member out of the two plate-shaped members.

5. The barrier mechanism according to claim 4, wherein the one end of the shaft member in the axial direction includes a stepped portion, and
the stepped portion is fitted into a recess portion provided in the other plate-shaped member.

6. The barrier mechanism according to claim 1, further comprising:
a sliding ring located between the flange portion and the barrier blade group, and retained rotatably by the spindle.

7. The barrier mechanism according to claim 6, wherein the sliding ring has a lubricating property.

8. A camera comprising:
an image taking device including a photographic optical lens; and
the barrier mechanism according to claim 1.

9. A mobile information terminal comprising:
an image taking device including a photographic optical lens; and
the barrier mechanism according to claim 1.

* * * * *